US012666348B2

(12) United States Patent
　　　Lin et al.

(10) Patent No.:　US 12,666,348 B2
(45) Date of Patent:　　Jun. 23, 2026

(54) PERIODIC NETWORK SELECTION BETWEEN EQUAL PRIORITY CANDIDATES BASED ON OPERATOR CONTROLLED SIGNAL THRESHOLD

(71) Applicant: MEDIATEK INC., Hsinchu (TW)

(72) Inventors: Yuan-Chieh Lin, Hsinchu (TW); Marko Niemi, Oulu (FI)

(73) Assignee: MEDIATEK INC., Hsinchu (TW)

( * ) Notice: Subject to any disclaimer, the term of this patent is extended or adjusted under 35 U.S.C. 154(b) by 294 days.

(21) Appl. No.: 18/385,454

(22) Filed: Oct. 31, 2023

(65) Prior Publication Data

US 2024/0155476 A1　　May 9, 2024

Related U.S. Application Data

(60) Provisional application No. 63/382,550, filed on Nov. 7, 2022.

(51) Int. Cl.
　　*H04W 48/18*　　(2009.01)
　　*H04W 84/04*　　(2009.01)
(52) U.S. Cl.
　　CPC .......... *H04W 48/18* (2013.01); *H04W 84/042* (2013.01)
(58) Field of Classification Search
　　CPC .... H04W 48/00; H04W 48/18; H04W 84/042
　　USPC .................................................. 455/422.1
　　See application file for complete search history.

(56) References Cited

U.S. PATENT DOCUMENTS

| | | | | |
|---|---|---|---|---|
| 2011/0300866 A1* | 12/2011 | Ali | .................. | H04W 36/00835 |
| | | | | 455/436 |
| 2012/0009930 A1* | 1/2012 | Brisebois | .............. | H04W 76/28 |
| | | | | 455/450 |
| 2023/0397071 A1* | 12/2023 | Spapis | .............. | H04W 36/1443 |
| 2024/0056932 A1* | 2/2024 | Qiao | .................. | H04W 36/305 |

OTHER PUBLICATIONS

3GPP TS 22.011 V18.3.0 (Jun. 2022), Technical Specification, 3rd Generation Partnership Project; Technical Specification Group Services and System Aspects; Service accessibility (Release 18).
European Patent Office, "Search Report", Mar. 19, 2024, Germany.

* cited by examiner

*Primary Examiner* — Qutbuddin Ghulamali
(74) *Attorney, Agent, or Firm* — Troutman Pepper Locke LLP; Tim Tingkang Xia, Esq.

(57) ABSTRACT

In an aspect of the disclosure, a method, a computer-readable medium, and an apparatus are provided. The apparatus may be a mobile station (MS). The MS registers to a first public land mobile network (PLMN) over a first access technology (AT). The MS determines that a received signal quality of the first PLMN over the first AT is lower than the operator controlled signal threshold per access technology. In response, the MS periodically attempts to obtain service on the first PLMN over a second AT. A received signal quality of the first PLMN over the second AT is equal to or greater than an operator controlled signal threshold per access technology.

13 Claims, 8 Drawing Sheets

802 register to a first public land mobile network (PLMN) over a first access technology (AT)

804 determine that a received signal quality of the first PLMN over the first AT is lower than the operator controlled signal threshold per access technology

806 periodically attempt to obtain service on the first PLMN over a second AT

PERIODIC NETWORK SELECTION BETWEEN EQUAL PRIORITY CANDIDATES BASED ON OPERATOR CONTROLLED SIGNAL THRESHOLD

CROSS-REFERENCE TO RELATED APPLICATION(S)

This application claims the benefits of U.S. Provisional Application Ser. No. 63/382,550, entitled "SELECTION OF RPLMN (& OTHER PLMN) WHEN OPERATOR CONTROLLED SIGNAL THRESHOLD PER ACCESS TECHNOLOGY IS SET (SENSE IS APPLIED)" and filed on Nov. 7, 2022, which is expressly incorporated by reference herein in its entirety.

BACKGROUND

Field

The present disclosure relates generally to communication systems, and more particularly, to techniques of selecting a public land mobile network (PLMN) combined with an access technology (AT).

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a mobile station (MS). The MS registers in a first public land mobile network (PLMN) over a first access technology (AT). The MS determines that a received signal quality of the first PLMN over the first AT is lower than the operator controlled signal threshold per access technology. In response, the MS periodically attempts to obtain service on the first PLMN over a second AT. A received signal quality of the first PLMN over the second AT is equal to or greater than an operator controlled signal threshold per access technology.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
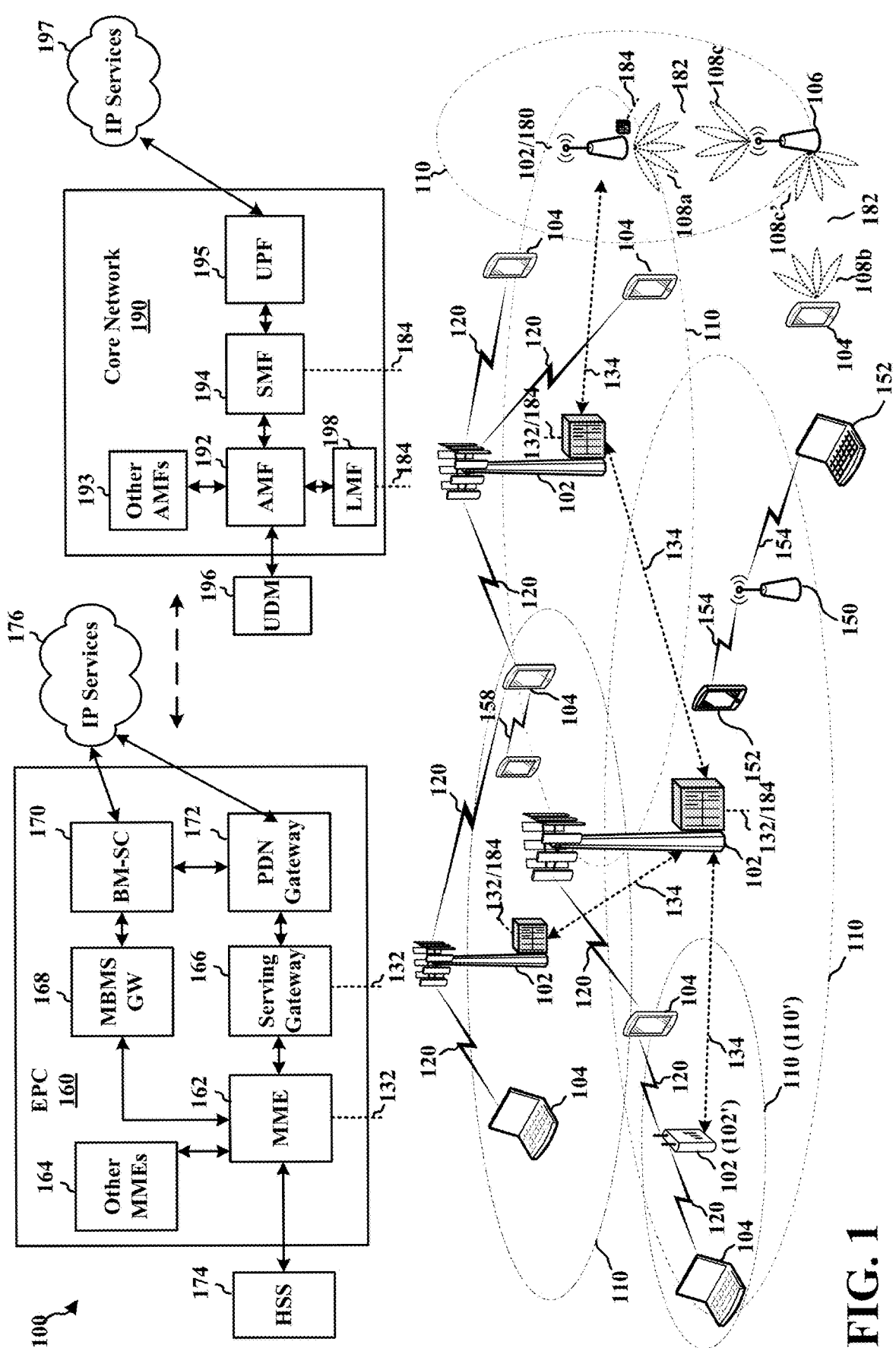
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for nonaccess stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to 7 MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108*a*. The UE 104 may receive the beamformed signal from the base station 180 in one or more receive directions 108*b*. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
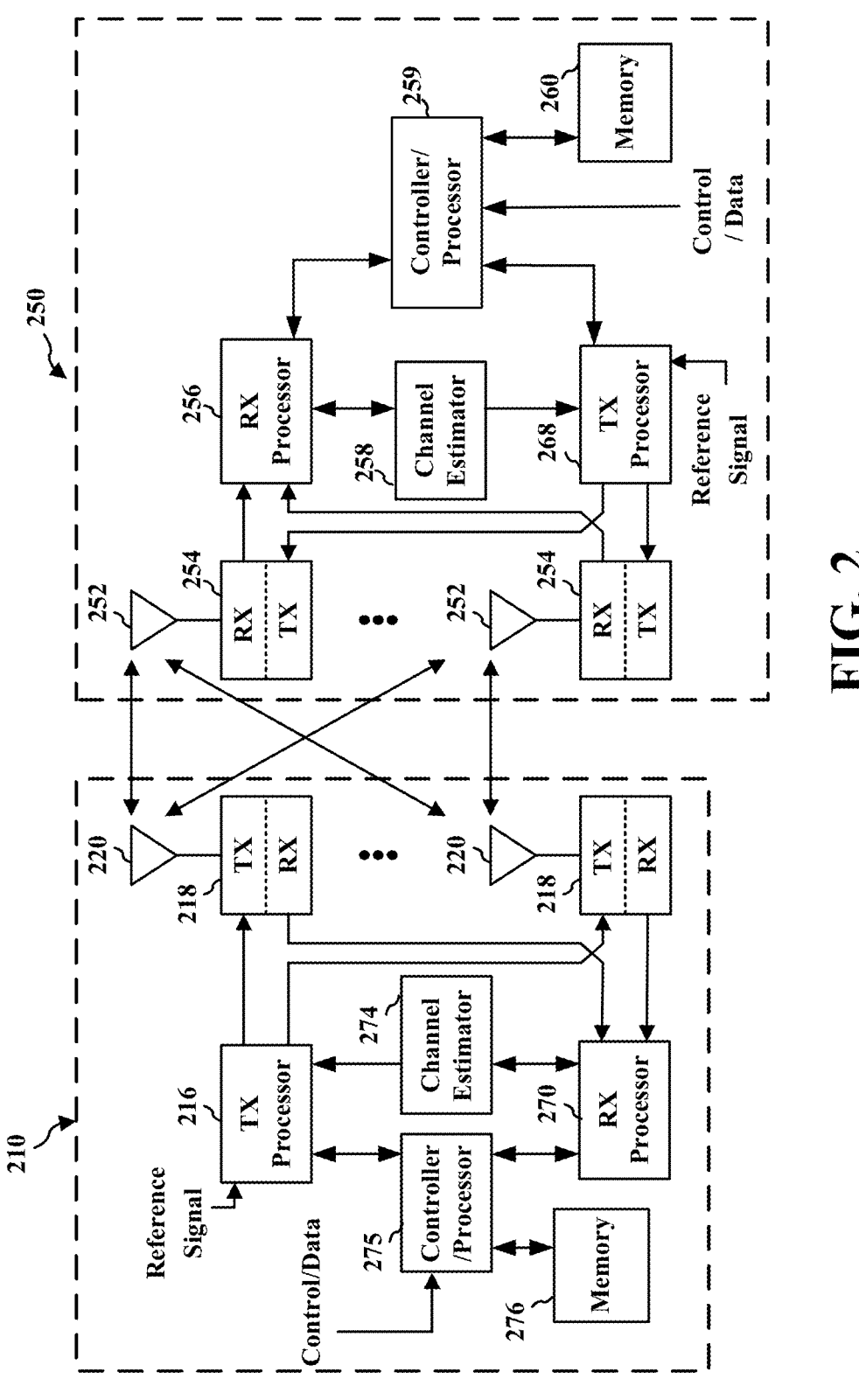
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers with a sub-carrier bandwidth of 60 kHz over a 0.25 ms duration or a bandwidth of 30 kHz over a 0.5 ms duration (similarly, 50 MHz BW for 15 kHz SCS over a 1 ms duration). Each radio frame may consist of 10 subframes (10, 20, 40 or 80 NR slots) with a length of 10 ms.

Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
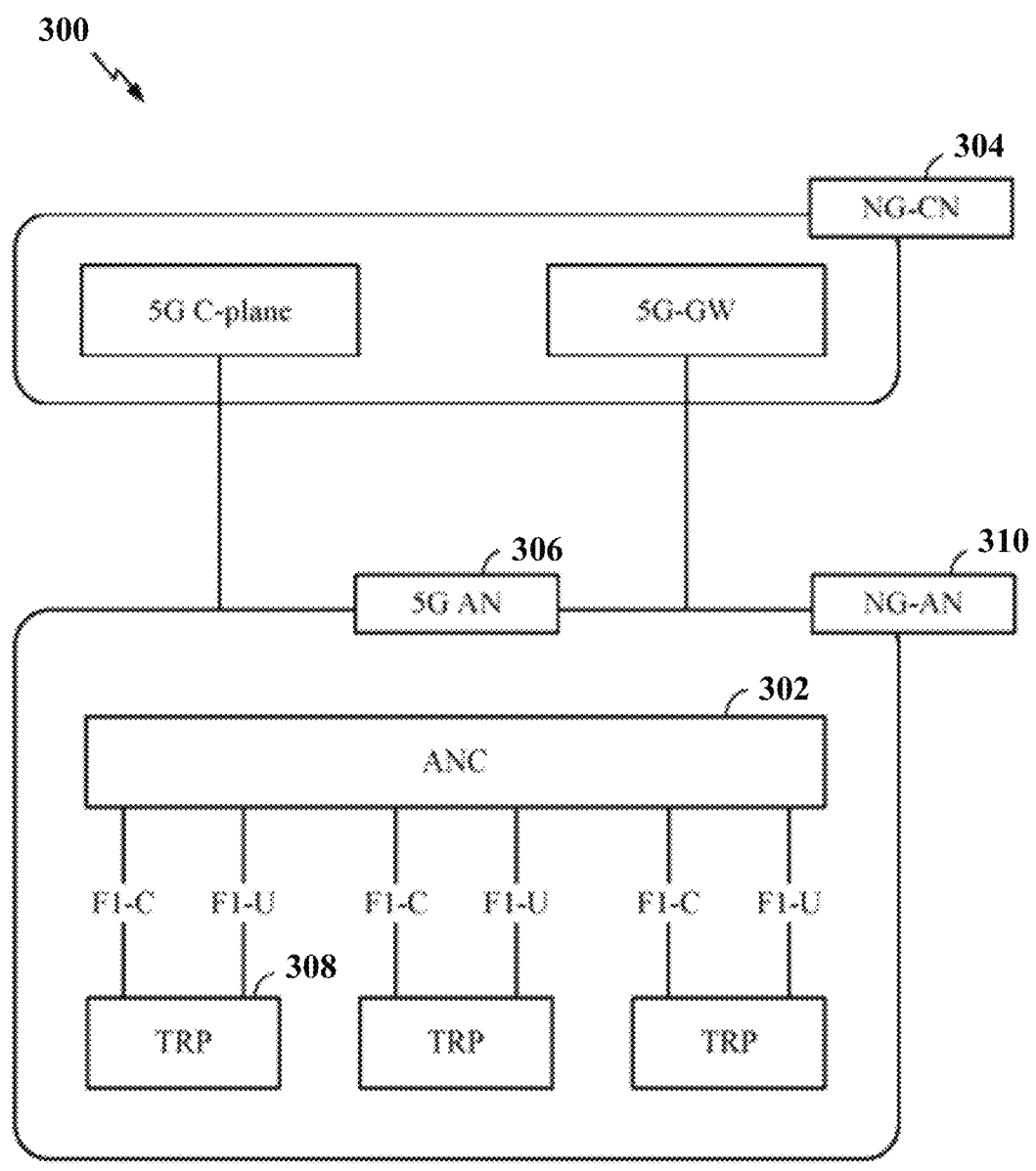
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
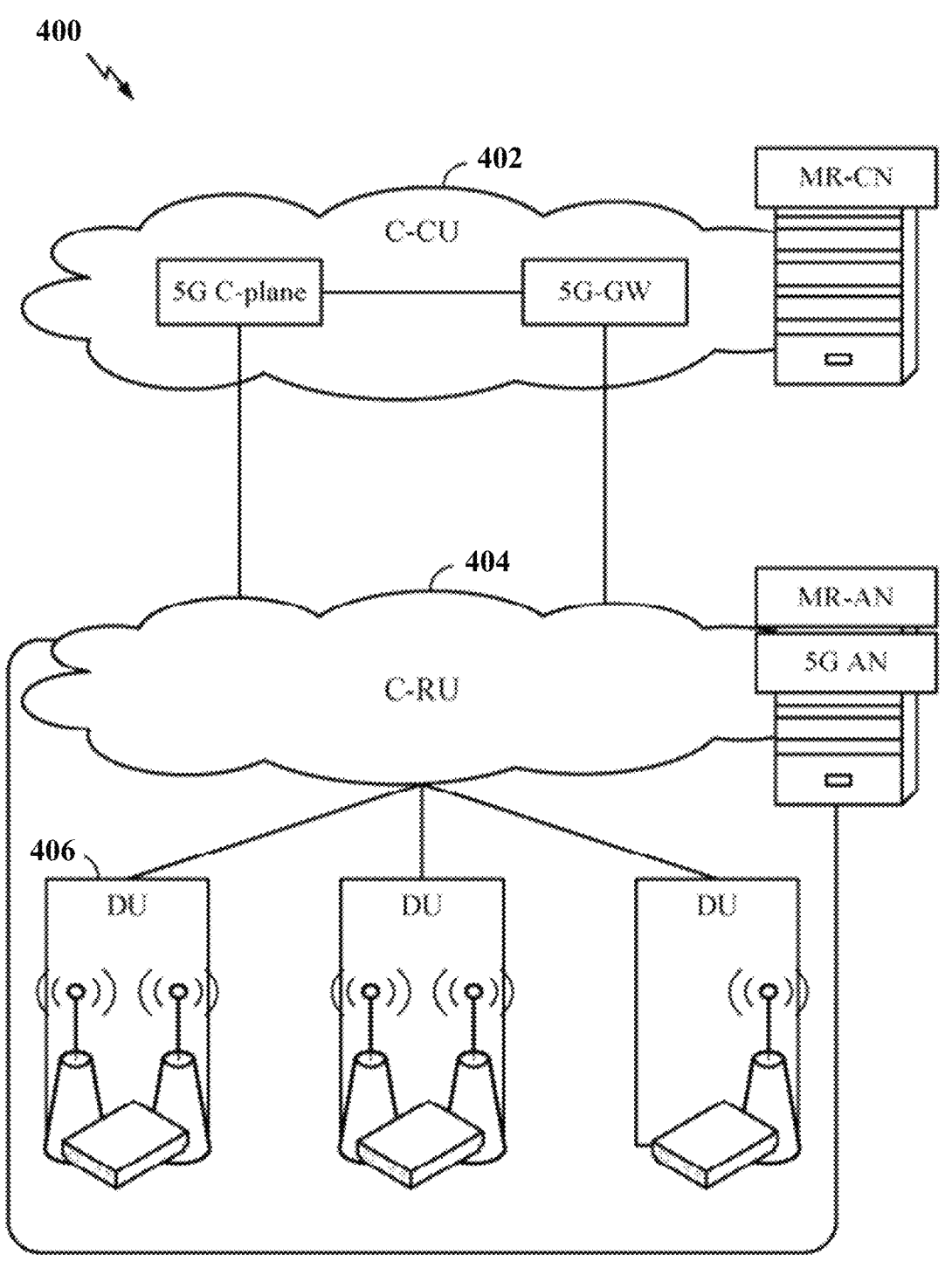
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
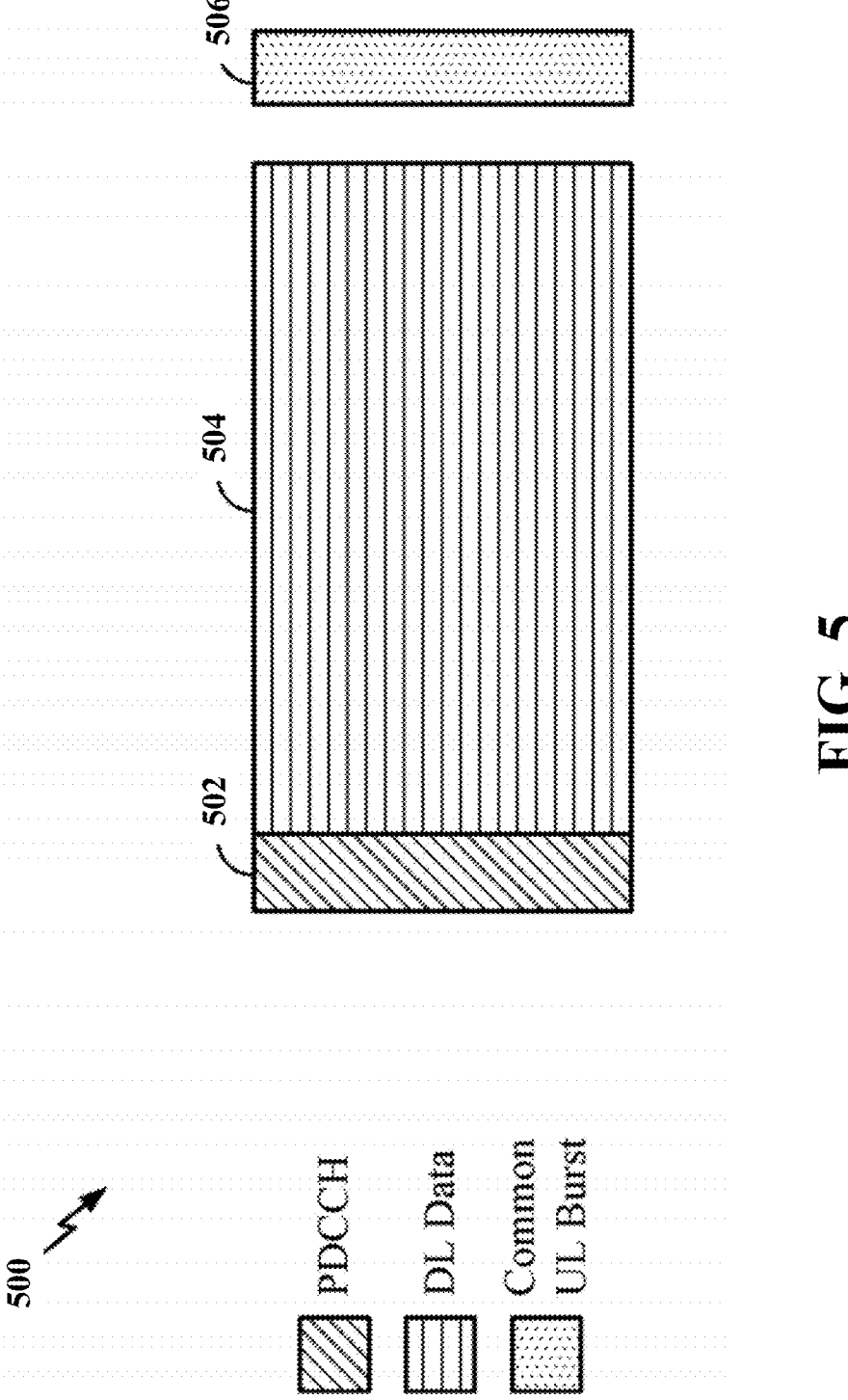
FIG. 5 is a diagram showing an example of a DL-centric slot.

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

Figure 6:
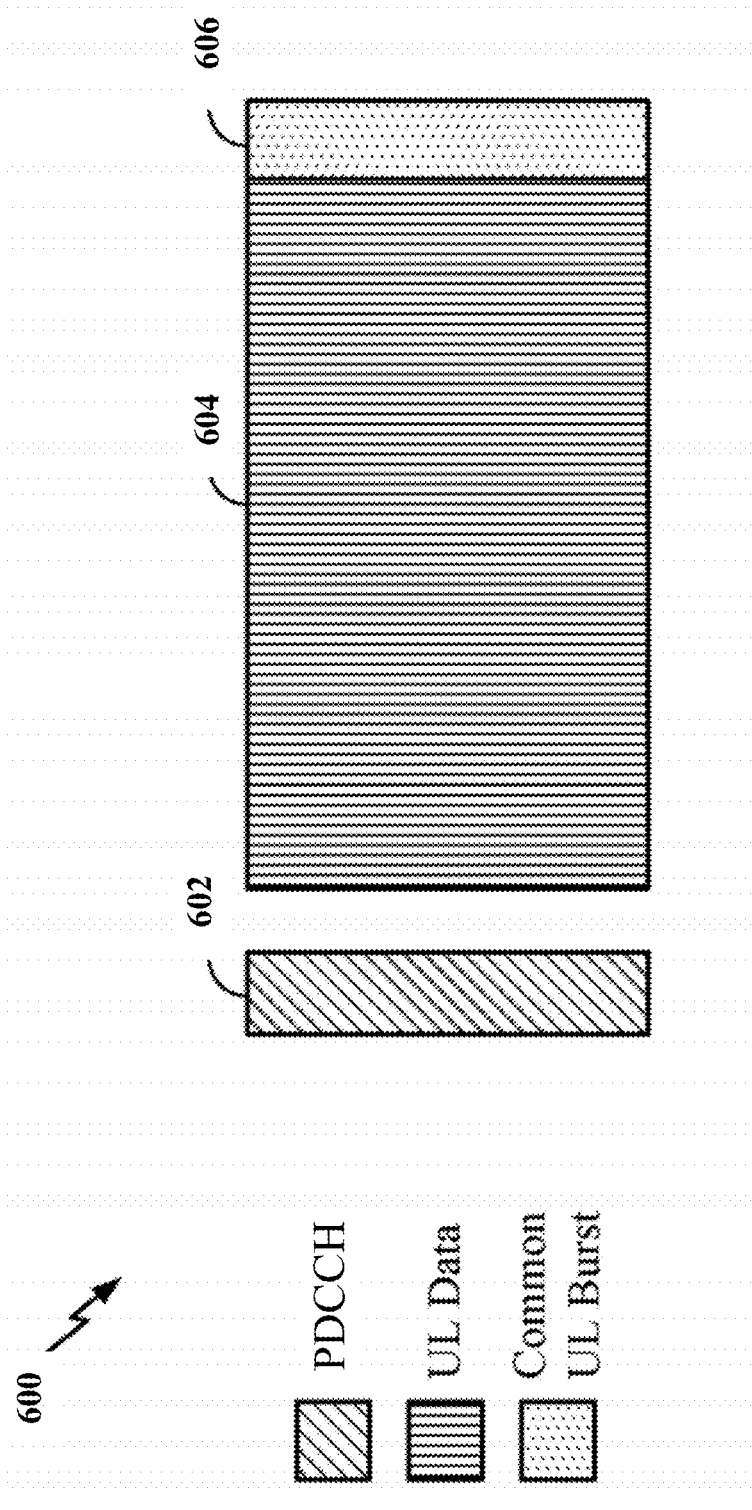
FIG. 6 is a diagram showing an example of an UL-centric slot.

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In communication between a mobile station (MS) and a network, public land mobile network (PLMN) and Access Technolog(ies) (ATs) combination selection are often involved. For the various selection priorities of PLMN/AT, the relevant design in 3GPP specifications is as follows:

i) Either the home PLMN (HPLMN) (if the equivalent HPLMN (EHPLMN) list does not exist or is empty) or the highest priority available EHPLMN (if the EHPLMN list exists);

ii) Each PLMN/AT combination in the "User Controlled PLMN Selector with Access Technology" data file in a subscriber identity module (SIM) or a Universal Mobile Telecommunications System (UMTS) subscriber identity module (USIM) of the MS (in priority order);

iii) Each PLMN/AT combination in the "Operator Controlled PLMN Selector with Access Technology" data file in the SIM/USIM (in priority order) or stored in the MS (in priority order);

iv) Other PLMN/AT combinations with received high quality signal in random order;

v) Other PLMN/AT combinations in order of decreasing signal quality.

From the above PLMN/AT selection priority design, it can be seen that in the traditional network selection process, the MS usually prefers to select its "home" network, even if there is a nearby non-"home" network with stronger signals (because the "home" network has the highest priority).

During network management, one strategy is periodic reselection, which can be used to periodically check if there are better networks available compared to the current one. If so, the device will switch to that network. However, based on the above priorities, while this method is effective for mobile devices, as they may move into areas with stronger signals, it can cause issues for some stationary devices, such as IoT devices. This is because according to the selection priorities, even if there is a lower priority network with stronger signals nearby, the device will still select the weaker "home" or higher priority network. Therefore, it is necessary to optimize network selection.

An MS can also be referred to as a terminal, user equipment (UE), and mobile equipment (ME) etc. It can be a mobile phone or a computer with mobile capabilities, for example. The MS exchanges voice and/or data with the radio access network.

As mentioned before, network selection needs to be optimized. One optimization strategy is to apply signal level enhanced network selection (SENSE). The goal of SENSE is to improve the network selection process so that selection is based not only on PLMN priority, but also considers signal strength. SENSE introduces a signal threshold, so that if a network's signal strength is above this threshold, it will be given priority consideration. Thus, even if the "local" high priority network has a weaker signal, the device may choose a low priority network with a stronger signal.

In an exemplary of non-periodic automatic PLMN selection, when the MS does not apply SENSE, the selection preference order is:

1) HPLMN (if EHPLMN list does not exist or is empty) or highest priority available EHPLMN (if EHPLMN list exists); e.g. HPLMN 111.11;

2) Each PLMN/AT combination in the "User Controlled PLMN Selector with Access Technology" data file in the SIM/USIM (in priority order); e.g. 1st entry: 222.11 GSM, UTRAN, EUTRAN, NG-RAN; 2nd entry: 222.22 EUTRAN, NG-RAN (4G EUTRAN and 5G NG-RAN have same priority); 3rd entry: 222.33 no particular AT indicated;

3) Each PLMN/AT combination in the "Operator Controlled PLMN Selector with Access Technology" data file in the SIM/USIM (in priority order) or stored in the ME (in priority order); e.g. 1st entry: 333.11 no particular AT indicated; 2nd entry: 333.22 EUTRAN, NG-RAN; 3rd entry: 333.33 no particular AT indicated;

4) Other PLMN/AT combinations with received high quality signal in random order;

5) Other PLMN/AT combinations in order of decreasing signal quality.

If the MS applies SENSE, using the "Operator controlled signal threshold per access technology" (e.g., −110 dBm) configured in the SIM/USIM, the selection preference order becomes:

1a) HPLMN (if EHPLMN list does not exist or is empty) or highest priority available EHPLMN (if EHPLMN list exists), if received signal quality>="Operator controlled signal threshold per access technology";

2a) Each PLMN/AT combination in the "User Controlled PLMN Selector with Access Technology" data file in the SIM/USIM (in priority order), if received signal quality>="Operator controlled signal threshold per access technology";

3a) Each PLMN/AT combination in the "Operator Controlled PLMN Selector with Access Technology" data file in the SIM/USIM (in priority order) or stored in the ME (in priority order), if received signal quality>="Operator controlled signal threshold per access technology";

4a) Other PLMN/AT combinations with received high quality signal in random order (NOTE: high quality means always >="Operator controlled signal threshold per access technology", because the allowed range of the Operator controlled signal threshold per access technology is between the cell selection criterion and the high quality signal);

5a) Other PLMN/AT combinations in order of decreasing signal quality, if received signal quality>="Operator controlled signal threshold per access technology".

1b) HPLMN (if EHPLMN list does not exist or is empty) or highest priority available EHPLMN (if EHPLMN list exists), if received signal quality<"Operator controlled signal threshold per access technology";

2b) Each PLMN/AT combination in the "User Controlled PLMN Selector with Access Technology" data file in the SIM/USIM (in priority order), if received signal quality<"Operator controlled signal threshold per access technology";

3b) Each PLMN/AT combination in the "Operator Controlled PLMN Selector with Access Technology" data file in the SIM/USIM (in priority order) or stored in the ME (in priority order), if received signal quality<"Operator controlled signal threshold per access technology";

5b) Other PLMN/AT combinations in order of decreasing signal quality, if received signal quality<"Operator controlled signal threshold per access technology".

With SENSE applied, the candidates are split into two groups by the signal threshold. Group a (with items 1a, 2a, 3a, 4a, 5a), with signal strength>=threshold, is always higher priority than group b (with items 1b, 2b, 3b, 5b), with signal strength<threshold. This allows signal strength to be guaranteed by giving priority selection within group a.

In the example of the selectable networks, a signal strength of different PLMN/AT (including signal threshold, cell selection criteria, etc.) combinations is shown in Table 1 below:

TABLE 1

| PLMN/AT (priority from high to low) | Signal Strength |
|---|---|
| (E)HPLMN, corresponding to 1a | −100 dBM |
| U-PLMN, corresponding to 2a | −100 dBM |
| O-PLMN, corresponding to 3a | −100 dBM |
| HQ-PLMN, corresponding to 4a | −109 dBM |
| LQ-PLMN, corresponding to 5a | −111 dBM |
| SENSE signal threshold | −115 dBM |
| (E)HPLMN, corresponding to 1b | −117 dBM |
| U-PLMN, corresponding to 2b | −117 dBM |
| O-PLMN, corresponding to 3b | −117 dBM |
| LQ-PLMN, corresponding to 5b | −117 dBM |
| Cell selection criterion | −120 dBM |

In a conventional approach, the criteria of periodic network selection based on Operator controlled signal threshold are: (1) If the (SENSE is applied)/("Operator controlled signal threshold per access technology" is set on the SIM/USIM), the UE performs the periodic network selection procedure considering all PLMNs, of higher or lower priority than the current PLMN, in the same order as defined in Automatic network selection mode, with the following conditions: (1.1) the UE shall select a higher priority PLMN/access technology combination if the target PLMN's access technology signal quality is equal to or higher than the "Operator controlled signal threshold per access technology"; (1.2) the UE shall select a lower priority PLMN/access technology combination only if the RPLMN's access technology signal quality is lower than the "Operator controlled signal threshold per access technology", and the target PLMN's access technology signal quality is equal or higher than the "Operator controlled signal threshold per access technology". (2) If no PLMN, including the RPLMN, fulfils the Operator controlled signal threshold criteria, the UE performs the normal periodic network selection for higher priority PLMNs, without applying the Operator controlled signal threshold per access technology. However, when (1) the original registered PLMN (Registered PLMN, RPLMN for short)/AT and (2) the candidate PLMN/AT have no priority difference, how the periodic PLMN selection should work is uncertain. For example, periodic network selection does not handle the case of candidate PLMN/AT combinations with the same priority.

Figure 7:
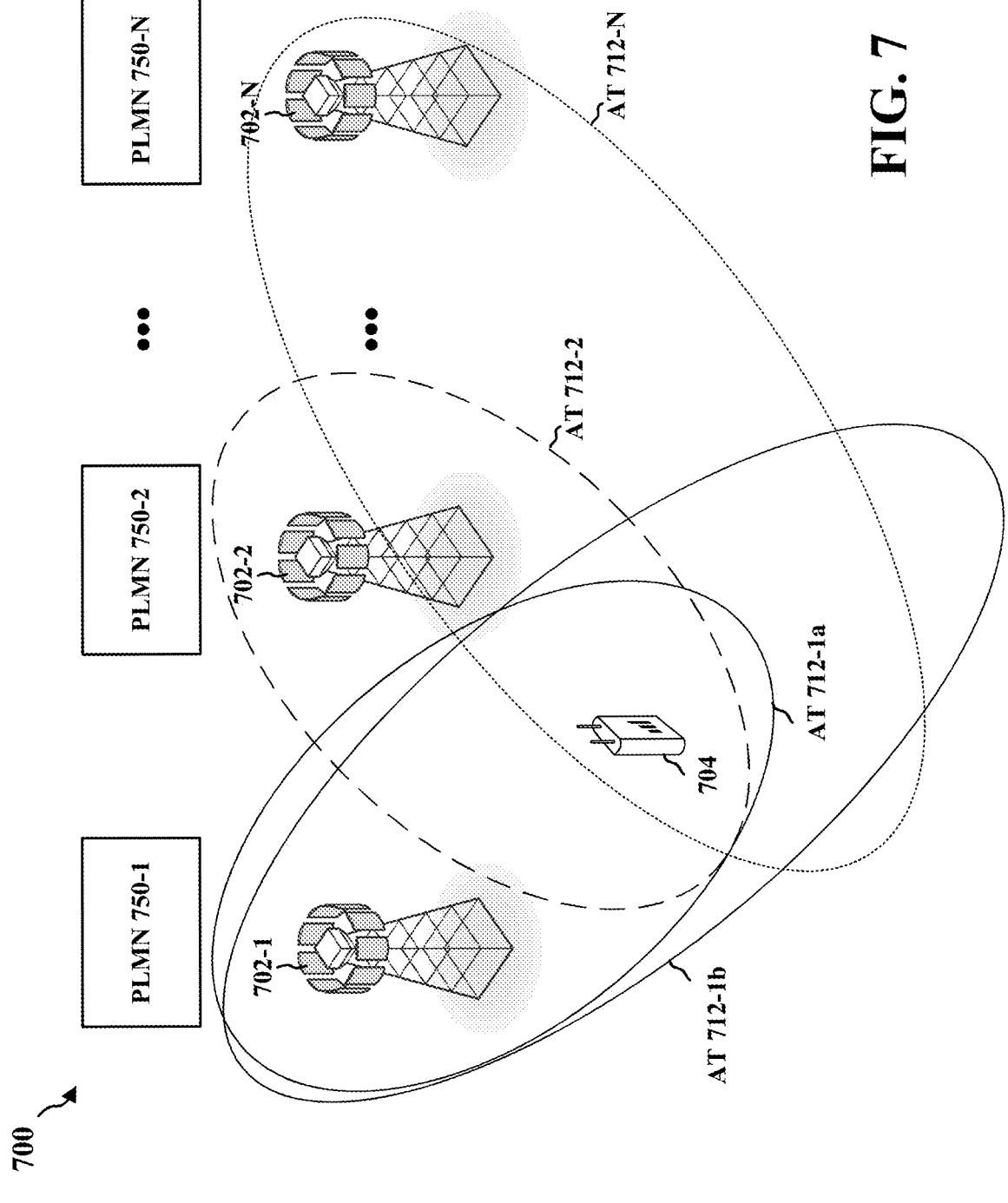
FIG. 7 is a diagram illustrating PLMN selection.

FIG. 7 is a diagram 700 illustrating PLMN selection. Base stations 702-1, 702-1, . . . 702-N provide accesses to PLMNs 750-1, 750-2, . . . , 750-N, respectively. Further, each of the base stations 702-1, 702-1, . . . 702-N may be accessed through one or more ATs in corresponding coverage areas. For example, the base station 702-1 may be accessed through a AT 712-1a and a AT 712-1b, etc.; the base station 702-2 may be accessed through a AT 712-2, and so on. Each AT may be one of GSM, UTRAN, EUTRAN, NG-RAN, etc.

In the SIM/USIM file of the MS 704, a PLMN entry may indicate multiple ATs, i.e., a PLMN Access Technology Identifier contains/sets more than one ATs. For example, the PLMN 750-1 may be PLMN XYZ, the AT 712-1a may be EUTRAN, and the AT 712-1b may be NG-RAN. Further, EUTRAN and NG-RAN are both "bit=1: AT selected", i.e., no priority is defined for the PLMN XYZ network. The PLMN XYZ network uses both EUTRAN AT and NG-RAN AT. In this example, PLMN XYZ/EUTRAN is the current RPLMN/AT. RPLMN refers to registered PLMN. The signal strength of PLMN XYZ/EUTRAN at the MS 704 is less than the threshold. The signal strength of RPLMN XYZ/NG-RAN is larger than or equal to the threshold.

In this example, since the MS 704 considers PLMN XYZ/EUTRAN and PLMN XYZ/NG-RAN as having the same priority in PLMN selection, the MS 704 will not re-select to RPLMN XYZ/NG-RAN (even though it is greater than the threshold while PLMN XYZ/EUTRAN is less than the threshold), because the MS 704 does not consider it as a higher priority PLMN/AT combination than RPLMN XYZ/EUTRAN (the MS 704 considers PLMN XYZ/EUTRAN and PLMN XYZ/NG-RAN as same/equal priority candidates).

To address this, the following method for network selection can be applied in embodiments of the present invention: If SENSE is applied and the received signal quality of the RPLMN observed over an averaging window is lower than the "Operator controlled signal threshold per access technology", the MS may periodically attempt to obtain service on allowable PLMN/AT combinations, for which the received signal quality of the candidate PLMN/AT combination is equal to or greater than the applicable "Operator controlled signal threshold per access technology". This applies to the requirements of i), ii), iii), iv) and v) as defined in the Automatic Network Selection Mode in "3GPP TS 23.122 V17.8.0 (2022-09) Technical Specification 3rd Generation Partnership Project; Technical Specification Group Core Network and Terminals; Non-Access-Stratum (NAS) functions related to Mobile Station (MS) in idle mode (Release 17)," which is expressly incorporated by reference herein in its entirety.

In one example, the MS 704 is currently registered to the PLMN 750-1 (which is the RPLMN) over the AT 712-1a. The MS 704 supports and applies SENSE, and the received signal quality with the AT 712-1a of the PLMN 750-1 at the MS 704 is lower than the "Operator controlled signal threshold per access technology". Then the MS 704 periodically attempts to obtain service on another AT (e.g., the AT 712-1*b*) of the PLMN 750-1, where the received signal quality with the another AT of the PLMN 750-1 is equal to or greater than the "Operator controlled signal threshold per access technology". Some configurations for the MS 704 may include one or more of: (1) The SIM/USIM does not define any priority difference between the first AT and the second AT; (2) If a SIM/USIM file entry indicates more than one AT, no priority is defined among the ATs within that entry; and (3) If no particular AT is indicated in a SIM/USIM file entry, it shall be assumed that all ATs supported by the ME apply to that entry.

The first and second ATs (e.g., the AT 712-1*a* and the AT 712-1*b*) may be indicated in a single entry of a PLMN entry (e.g., entry for the PLMN 750-1), which for example can be in the SIM/USIM "User Controlled PLMN Selector with Access Technology" data file or "Operator Controlled PLMN Selector with Access Technology" data file. The first PLMN may be a (1) HPLMN; (2) EHPLMN; (3) A PLMN indicated in a PLMN entry of the EFPLMNwAcT (User controlled PLMN selector with Access Technology), where the entry indicates the first and second ATs, or where there is no AT indicated in the entry; or (4) A PLMN indicated in a PLMN entry of the EFOPLMNwAcT (Operator controlled PLMN selector with Access Technology), where the entry indicates the first and second ATs, or where there is no AT indicated in the entry.

Specifically, in a first technique, if SENSE is applied to and "Operator controlled signal threshold per access technology" is configured on the SIM/USIM of the MS (e.g., the MS 704), the MS performs the periodic network selection procedure considering all PLMNs (e.g., the PLMNs 750-1, 750-2, . . . , 750-N), of higher or lower priority than the current PLMN/AT combination (e.g., the PLMN 750-1 with the AT 712-1*a*), in the same order as defined in the Automatic Network Selection Mode, with the following conditions:

(1) If the target PLMN's AT (e.g., the AT 712-2 of the PLMN 750-2) signal quality is equal to or higher than the "Operator controlled signal threshold per access technology", the MS selects the higher priority PLMN/AT combination (e.g., the PLMN 750-2 with the AT 712-2).

(2) The MS only selects a lower priority or equal priority PLMN/AT combination (e.g., the PLMN 750-1 with the AT 712-1*b*) if the RPLMN's AT (e.g., the AT 712-1*a* of the PLMN 750-1) signal quality is lower than the "Operator controlled signal threshold per access technology", and the target PLMN's AT signal quality is equal to or higher than the "Operator controlled signal threshold per access technology".

(3) If no PLMN (including RPLMN) satisfies the operator controlled signal threshold criteria, the MS performs normal periodic network selection for higher priority PLMNs, without applying the "Operator controlled signal threshold per access technology".

In a second technique, if SENSE is applied and "Operator controlled signal threshold per access technology" is configured on the SIM/USIM of the MS (e.g., the MS 704), the MS performs the periodic network selection procedure considering all PLMNs (e.g., the PLMNs 750-1, 750-2, . . . , 750-N), of higher or lower priority than the current PLMN/AT combination (e.g., the PLMN 750-1 with the AT 712-1*a*), in the same order as defined in the Automatic Network Selection Mode, with the following conditions:

(1) If the target PLMN's AT (e.g., the AT 712-1*b* of the PLMN 750-1) signal quality is equal to or higher than the "Operator controlled signal threshold per access technology", the MS selects the higher priority or equal priority PLMN/AT combination.

(2) The MS only selects a lower priority PLMN/AT combination (e.g., the PLMN 750-2 with the AT 712-2) if the RPLMN's AT (e.g., the AT 712-1*a* of the PLMN 750-1) signal quality is lower than the "Operator controlled signal threshold per access technology", and the target PLMN's AT signal quality is equal to or higher than the "Operator controlled signal threshold per access technology".

(3) If no PLMN (including RPLMN) satisfies the operator controlled signal threshold criteria, the MS performs normal periodic network selection for higher priority PLMNs, without applying the "Operator controlled signal threshold per access technology".

In a third technique, if SENSE is applied and "Operator controlled signal threshold per access technology" is configured on the SIM/USIM of the MS (e.g., the MS 704), the MS performs the periodic network selection procedure considering all PLMNs (e.g., the PLMNs 750-1, 750-2, . . . , 750-N), of higher or lower priority than the current PLMN/ AT combination (e.g., the PLMN 750-1 with the AT 712-1*a*), in the same order as defined in the Automatic Network Selection Mode, with the following conditions:

(1) If the signal quality of the higher priority PLMN/AT combination (e.g., the PLMN 750-2 with the AT 712-2) is equal to or higher than the "Operator controlled signal threshold per access technology", the MS selects the higher priority PLMN/AT combination (e.g., the PLMN 750-2 with the AT 712-2).

(2) The MS only selects a lower or equal priority PLMN/AT combination (e.g., the PLMN 750-1 with the AT 712-1*b*) if the RPLMN's AT signal quality (e.g., the AT 712-1*a* of the PLMN 750-1) is lower than the "Operator controlled signal threshold per access technology", and the signal quality of the lower or equal priority PLMN/AT combination (e.g., the PLMN 750-1 with the AT 712-1*b*) is equal or higher than the "Operator controlled signal threshold per access technology".

(3) If no PLMN (including RPLMN) satisfies the operator controlled signal threshold criteria, the MS performs normal periodic network selection for higher priority PLMNs, without applying the "Operator controlled signal threshold per access technology".

In a fourth technique, if SENSE is applied and "Operator controlled signal threshold per access technology" is configured on the SIM/USIM of the MS (e.g., the MS 704), the MS performs the periodic network selection procedure considering all PLMNs (e.g., the PLMNs 750-1, 750-2, . . . , 750-N), of higher or lower priority than the current PLMN/ AT combination (e.g., the PLMN 750-1 with the AT 712-1*a*), in the same order as defined in Automatic network selection mode, with the following conditions:

(1) The MS shall select a higher or equal priority PLMN/ AT combination (e.g., the PLMN 750-1 with the AT 712-1*b*) if the signal quality of the higher or equal priority PLMN/AT combination (e.g., the PLMN 750-1 with the RAT 712-1*b*) is equal to or higher than the "Operator controlled signal threshold per access technology".

(2) The MS shall select a lower priority PLMN/AT combination (e.g., the PLMN 750-2 with the AT 712-2) only if the RPLMN's AT signal quality (e.g., the AT 712-1*a* of the PLMN 750-1) is lower than the "Operator controlled signal threshold per access technology", and the signal quality of the target PLMN/AT combination (e.g., the PLMN 750-2 with the AT 712-2) is equal or higher than the "Operator controlled signal threshold per access technology".

(3) If no PLMN (including RPLMN) satisfies the operator controlled signal threshold criteria, the MS performs the normal periodic network selection for higher priority PLMNs, without applying the "Operator controlled signal threshold per access technology".

Figure 8:
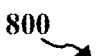
FIG. 8 is a flowchart of a method (process) for selecting a PLMN/AT combination.
Figure 8:
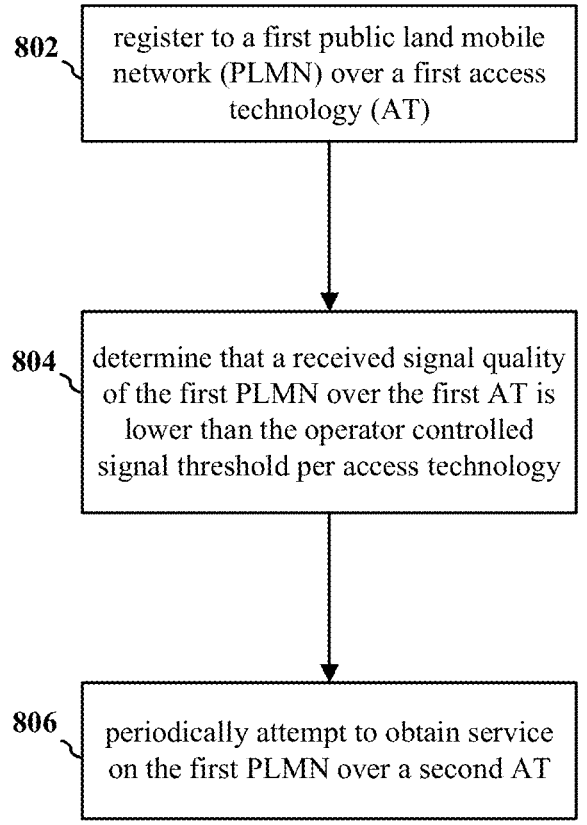

FIG. 8 is a flowchart 800 of a method (process) for selecting a PLMN/AT combination. The method may be performed by an MS. In operation 802, the MS registers to a first public land mobile network (PLMN) over a first access technology (AT). In operation 804, the MS determines that a received signal quality of the first PLMN over the first AT is lower than the operator controlled signal threshold per access technology. In operation 806, in response to determining the received signal quality is lower than the threshold, the MS periodically attempts to obtain service on the first PLMN over a second AT. The received signal quality of the first PLMN over the second AT is equal to or greater than the operator controlled signal threshold per access technology.

In certain configurations, the MS may have no priority defined in its SIM or USIM between the first AT and second AT of the first PLMN. In certain configurations, no access technology is indicated in a User Controlled PLMN Selector with Access Technology data file or an Operator Controlled PLMN Selector with Access Technology data file in an SIM or USIM entry for the first PLMN. The first AT and the second AT are both supported by the MS.

In certain configurations, the first AT and the second AT for the first PLMN are indicated in a first single record in a User Controlled PLMN Selector with Access Technology data file or an Operator Controlled PLMN Selector with Access Technology data file in the SIM or USIM. The first single record contains both a PLMN identity and an associated PLMN Access Technology Identifier indicating more than one ATs. The PLMN identity indicates the first PLMN and the associated PLMN Access Technology Identifier indicates both the first AT and the second AT.

In certain configurations, the first AT and the second AT for the first PLMN are indicated in a single PLMN entry in a User Controlled PLMN Selector with Access Technology data file or an Operator Controlled PLMN Selector with Access Technology data file in the SIM or USIM.

In certain configurations, the first PLMN is one of: a home PLMN (HPLMN); an equivalent HPLMN (EHPLMN); a PLMN indicated in a PLMN entry of a User Controlled PLMN Selector with Access Technology data file, wherein the PLMN entry indicates the first AT and the second AT; and a PLMN indicated in a PLMN entry of an Operator Controlled PLMN selector with Access Technology data file, wherein the PLMN entry indicates the first AT and the second AT.

In certain configurations, to periodically attempt to obtain service, the MS performs a periodic network selection procedure considering the first PLMN over the second AT as an equal priority PLMN/AT combination as the first PLMN over the first AT.

In certain configurations, the periodic network selection procedure selects the first PLMN over the second AT based on the received signal quality of the first PLMN over the second AT being equal to or greater than the Operator controlled signal threshold per access technology.

In certain configurations, to periodically attempt to obtain service, the MS performs a periodic network selection procedure considering the first PLMN over the second AT as a lower priority PLMN/AT combination than the first PLMN over the first AT. In certain configurations, the periodic network selection procedure selects the first PLMN over the second AT based on: the received signal quality of the first PLMN over the first AT being lower than the Operator controlled signal threshold per access technology, and the received signal quality of the first PLMN over the second AT being equal to or greater than the operator controlled signal threshold per access technology.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a mobile station (MS), comprising:

registering the MS to a first public land mobile network (PLMN) over a first access technology (AT);

determining that a received signal quality of the first PLMN over the first AT is lower than an Operator controlled signal threshold per access technology; and in response, periodically attempting, by the MS, to obtain service on the first PLMN over a second AT, wherein a received signal quality of the first PLMN over the second AT is equal to or greater than the Operator controlled signal threshold per access technology;

wherein the periodically attempting to obtain service comprises performing a periodic network selection procedure considering the first PLMN over the second AT as an equal priority PLMN/AT combination as the first PLMN over the first AT;

wherein the periodic network selection procedure selects the first PLMN over the second AT based on the received signal quality of the first PLMN over the second AT being equal to or greater than the Operator controlled signal threshold per access technology.

2. The method of claim 1, wherein no priority is defined in a subscriber identity module (SIM) or a Universal Mobile Telecommunications System (UMTS) subscriber identity module (USIM) of the MS between the first AT and the second AT of the first PLMN.

3. The method of claim 1, wherein no access technology is indicated in a User Controlled PLMN Selector with Access Technology data file or an Operator Controlled PLMN Selector with Access Technology data file in an SIM or USIM entry for the first PLMN, wherein the first AT and the second AT are both supported by the MS.

4. The method of claim 1, wherein the first AT and the second AT for the first PLMN are indicated in a first single record in a User Controlled PLMN Selector with Access Technology data file or an Operator Controlled PLMN Selector with Access Technology data file in the SIM or USIM, wherein the first single record contains both a PLMN identity and an associated PLMN Access Technology Identifier indicating more than one ATs, wherein the PLMN identity indicates the first PLMN and the associated PLMN Access Technology Identifier indicates both the first AT and the second AT.

5. The method of claim 1, wherein the first AT and the second AT for the first PLMN are indicated in a single PLMN entry in a User Controlled PLMN Selector with Access Technology data file or an Operator Controlled PLMN Selector with Access Technology data file in the SIM or USIM.

6. The method of claim 1, wherein the first PLMN is one of a home PLMN (HPLMN);

an equivalent HPLMN (EHPLMN);

a PLMN indicated in a PLMN entry of a User Controlled PLMN Selector with Access Technology data file, wherein the PLMN entry indicates the first AT and the second AT; and a PLMN indicated in a PLMN entry of an Operator Controlled PLMN selector with Access Technology data file, wherein the PLMN entry indicates the first AT and the second AT.

7. An apparatus for wireless communication, the apparatus being a mobile station (MS), comprising:

a memory; and at least one processor coupled to the memory and configured to:

register the MS to a first public land mobile network (PLMN) over a first access technology (AT);

determine that a received signal quality of the first PLMN over the first AT is lower than an operator controlled signal threshold per access technology; and in response, periodically attempt, to obtain service on the first PLMN over a second AT, wherein a received signal quality of the first PLMN over the second AT is equal to or greater than the operator controlled signal threshold per access technology;

wherein to periodically attempt to obtain service, the at least one processor is further configured to perform a periodic network selection procedure considering the first PLMN over the second AT as an equal priority PLMN/AT combination as the first PLMN over the first AT;

wherein the periodic network selection procedure selects the first PLMN over the second AT based on the received signal quality of the first PLMN over the second AT being equal to or greater than the operator controlled signal threshold per access technology.

8. The apparatus of claim 7, wherein no priority is defined in a subscriber identity module (SIM) or a Universal Mobile Telecommunications System (UMTS) subscriber identity module (USIM) of the MS between the first AT and the second AT of the first PLMN.

9. The apparatus of claim 7, wherein no access technology is indicated in a User Controlled PLMN Selector with Access Technology data file or an Operator Controlled PLMN Selector with Access Technology data file in an SIM or USIM entry for the first PLMN, wherein the first AT and the second AT are both supported by the MS.

10. The apparatus of claim 7, wherein the first AT and the second AT for the first PLMN are indicated in a first single record in a User Controlled PLMN Selector with Access Technology data file or an Operator Controlled PLMN Selector with Access Technology data file in the SIM or USIM, wherein the first single record contains both a PLMN identity and an associated PLMN Access Technology Identifier indicating more than one ATs, wherein the PLMN identity indicates the first PLMN and the associated PLMN Access Technology Identifier indicates both the first AT and the second AT.

11. The apparatus of claim 7, wherein the first AT and the second AT for the first PLMN are indicated in a single PLMN entry in a User Controlled PLMN Selector with Access Technology data file or an Operator Controlled PLMN Selector with Access Technology data file in the SIM or USIM.

12. The apparatus of claim 7, wherein the first PLMN is one of:

a home PLMN (HPLMN);

an equivalent HPLMN (EHPLMN);

a PLMN indicated in a PLMN entry of a User Controlled PLMN Selector with Access Technology file, wherein the PLMN entry indicates the first AT and the second AT; and a PLMN indicated in a PLMN entry of an Operator Controlled PLMN selector with Access Technology file, wherein the PLMN entry indicates the first AT and the second AT.

13. A non-transitory computer-readable medium storing computer executable code for wireless communication of a user equipment (UE), comprising code to:

register the UE to a first public land mobile network (PLMN) over a first access technology (AT);

determine that a received signal quality of the first PLMN over the first AT is lower than an operator controlled signal threshold per access technology; and in response, periodically attempt, by the UE, to obtain service on the first PLMN over a second AT, wherein a received signal quality of the first PLMN over the second AT is equal to or greater than the operator controlled signal threshold per access technology;

wherein the periodically attempting to obtain service comprises performing a periodic network selection procedure considering the first PLMN over the second AT as an equal priority PLMN/AT combination as the first PLMN over the first AT;

wherein the periodic network selection procedure selects the first PLMN over the second AT based on the received signal quality of the first PLMN over the second AT being equal to or greater than the operator controlled signal threshold per access technology.

\* \* \* \* \*